(12) United States Patent
Hwang et al.

(10) Patent No.: US 8,131,207 B2
(45) Date of Patent: Mar. 6, 2012

(54) UBIQUITOUS HOME NETWORK SYSTEM

(75) Inventors: Sung-Il Hwang, Seoul (KR); Young-Jin Kim, Suwon-si (KR)

(73) Assignee: MAXFOR Co., Ltd, Seongnam-si (KR)

( * ) Notice: Subject to any disclaimer, the term of this patent is extended or adjusted under 35 U.S.C. 154(b) by 1155 days.

(21) Appl. No.: 11/834,120

(22) Filed: Aug. 6, 2007

(65) Prior Publication Data

US 2008/0160938 A1 Jul. 3, 2008

(30) Foreign Application Priority Data

Dec. 27, 2006 (KR) ........................ 10-2006-0135480

(51) Int. Cl.
*H04H 1/00* (2006.01)
(52) U.S. Cl. .... 455/3.03; 455/4.1; 455/41.2; 455/151.1; 707/102; 725/81; 725/78; 725/140; 725/141; 340/825.22; 340/825
(58) Field of Classification Search ................ 455/41.2, 455/41.3, 132, 456.3, 132.2, 39, 3.03, 4.1, 455/151.1; 370/252, 343, 331, 463, 908, 370/257, 401; 340/825, 825.22, 825.72, 340/825.52, 2.1; 725/39, 87, 110, 81, 80, 725/109, 78, 140, 141, 153; 341/176, 173; 345/156; 700/83, 65, 66, 19, 20; 707/102
See application file for complete search history.

(56) References Cited

U.S. PATENT DOCUMENTS

| | | | | |
|---|---|---|---|---|
| 7,676,824 B2* | 3/2010 | Accarie et al. | .................. | 725/81 |
| 2003/0048757 A1* | 3/2003 | Accarie et al. | ................ | 370/257 |
| 2003/0106062 A1* | 6/2003 | Shteyn et al. | ................... | 725/78 |
| 2004/0125074 A1* | 7/2004 | Lin | ............................... | 345/156 |
| 2004/0162845 A1* | 8/2004 | Kim et al. | ..................... | 707/102 |
| 2004/0202206 A1* | 10/2004 | Lee | ............... | 370/908 |
| 2004/0236442 A1* | 11/2004 | Maymudes | ..................... | 700/83 |
| 2005/0085180 A1* | 4/2005 | Ballay et al. | ....................... | 455/1 |
| 2005/0119770 A1* | 6/2005 | Park et al. | ....................... | 700/65 |
| 2006/0044175 A1* | 3/2006 | Choi | ........................... | 341/173 |
| 2007/0055998 A1* | 3/2007 | Kang et al. | ...................... | 725/81 |
| 2007/0183436 A1* | 8/2007 | Hunter | ........................ | 370/401 |
| 2007/0205909 A1* | 9/2007 | Kung | ....................... | 340/825.22 |
| 2009/0094645 A1* | 4/2009 | Ting et al. | ....................... | 725/39 |

* cited by examiner

*Primary Examiner* — Tan Trinh
(74) *Attorney, Agent, or Firm* — Jefferson IP Law, LLP

(57) ABSTRACT

A system for processing data in a ubiquitous home network is provided. The system uses RF signals based on combination of the remote-controller and the ubiquitous sensor network (USN) technologies and integrally controls a plurality of control targets. Although the remote-controller is spaced relatively far apart from the control targets, the system can control the control targets only if the spaced distance is within the range of an RF signal. As well, the system can automatically control the control targets based on the information detected by the respective sensor nodes.

11 Claims, 5 Drawing Sheets

UBIQUITOUS HOME NETWORK SYSTEM

PRIORITY

This application claims the benefit under 35 U.S.C. §119 (a) of a Korean patent application filed on Dec. 27, 2006 in the Korean Intellectual Property Office and assigned Serial No. 10-2006-0135480, and the entire disclosure of which is hereby incorporated by reference.

BACKGROUND OF THE INVENTION

1. Field of the Invention

The present invention relates to a ubiquitous network system. More particularly, the present invention relates to a system and method for processing data in a ubiquitous home network.

2. Description of the Related Art

Recently, with the development of electronic control technology and communication technology, home-appliances have adopted wireless control technology such that they can be controlled by a remote-controller.

Exemplary examples of such home-appliances are televisions, DVD players, audio systems, air conditioners (electric fans, air cleaners, humidifiers, heaters, etc.), boilers, curtain systems, lights, cleaning robots, etc. What's more, as the number of home-appliances has increased, the number of the remote-controllers accompanying thereto has increased, that using them is confusing, storing them is inconvenient, and they are aesthetically unattractive.

To solve these problems, a universal remote-controller has been developed to integrally control a variety of control targets. That is, with only a single universal remote-controller, users can easily control various home-appliances.

In general, the remote-controller uses infrared rays to transmit control signals to control targets (home appliances). The IrDA has the following characteristics: its communication range is relatively short; data can be transmitted/received only through a specific direction, which is called an oriented structure; and the transmission and transmittance of an IR signal are low. Due to such characteristics, the IrDA devices can only be used to control close targets and those in an open space without any blocking structure therebetween. Therefore, if a control target is placed relatively far from a user or blocked by a structure between it and the user, the user must move closer to the control target.

Related to this, with the creation of a ubiquitous environment, ubiquitous sensor network (USN) technology has been researched and developed. The USN refers to a network where: USN nodes placed in a certain area detect the surrounding physical environment to transmit information about it to a server through RF signals, in which the transmitted information is repeated among the USN nodes until reaching the server, so that the server provides the received information to an administrator or controls a corresponding control target based on the received information.

The present applicant has filed the patent applications related to the USN technology in Korean Intellectual Property Office, entitled "UBIQUITOUS WIRELESS NETWORK SYSTEM, NODE MODULE, AND OPERATING METHOD THEREOF" assigned to Patent Application No. 10-2005-0133045, "TESTER FOR NODE MODULE OF UBIQUITOUS SENSOR NETWORK SYSTEM, METHOD OF TESTING MODE MODULE, AND REMOTE MONITORING APPARATUS OF UBIQUITOUS SENSOR NETWORK SYSTEM" assigned to Patent Application No. 10-2006-00630005, and "UBIQUITOUS SENSOR NETWORK SYSTEM AND GATEWAY THEREOF" assigned to Patent Application No. 10-2006-0102898, the entire disclosures of each of which are hereby incorporated by reference.

SUMMARY OF THE INVENTION

Therefore, the present invention has been made in view of the above problems, and it is an object of the present invention to provide technology to construct a ubiquitous home network system that can integrally and automatically control a plurality of control targets based on surrounding physical environments, as a remote control technology is combined with ubiquitous sensor network technology, in which information is transmitted through RF signals.

In accordance with an aspect of the present invention, the above and other objects can be accomplished by the provision of a ubiquitous home network system that includes a universal remote controller for converting a control command according to a user's command into a radio frequency (RF) signal to emit the RF signal; and at least one or more control nodes for converting the control command according to the RF signal, received from the universal remote controller, into a control signal to comply with control targets and emit the control signal.

In an exemplary implementation, the system may further include a home network server for emitting a previously set control command corresponding to the RF signal, received from the universal remote controller, to said at least one or more control nodes to control the control targets.

In an exemplary implementation, the system may further include at least one or more sensor nodes for detecting information from a surrounding physical environment, converting the detected information into an RF signal, and providing the RF signal to the home network server. Here, the home network server emits a previously set control command corresponding to the RF signal, received from said at least one or more sensor nodes, to said at least one or more control nodes to control the control targets.

In an exemplary implementation, the system may further includes at least one or more sensor nodes for detecting information from a surrounding physical environment, converting the detected information into an RF signal, and providing the RF signal to the universal remote controller. Here, the universal remote controller receives the RF signal, received from said at least one or more sensor nodes, and displays information according to the received RF signal.

In an exemplary implementation, the universal remote controller may re-emit a received RF signal.

In an exemplary implementation, the control nodes may re-emit received RF signals.

In accordance with another aspect of the present invention, there is provided a ubiquitous home network system that includes: a sensor node for detecting information from a surrounding physical environment, converting the detected information into an RF signal, and emitting the RF signal; a home network server for emitting an RF signal of a previously set control command that corresponds to the RF signal, received from the sensor node; and at least one or more control nodes for converting the RF signal, received from the home network server, into a control signal to comply with control targets, and emitting the control signal.

In an exemplary implementation, the sensor node may include a plurality of sensor nodes.

In an exemplary implementation, the sensor nodes may re-emit received RF signals.

In an exemplary implementation, the control nodes may re-emit received RF signals.

In accordance with another aspect of the present invention, there is provided a universal remote controller for a ubiquitous home network system, which includes: a command input unit for inputting a user's command; an RF communication unit for emitting an RF signal of a control command for control targets, which is based on the user's command, and for receiving an RF signal emitted from a sensor node that detects information from surrounding physical environment; and a display for displaying the information according to the RF signal received through the RF communication unit.

In an exemplary implementation, the RF communication unit includes: a signal transmitting/receiving means for transmitting/receiving RF signals; a signal converting means for converting a digital signal into an RF signal to provide it to the signal transmitting/receiving means and for converting the RF signal from the signal transmitting/receiving means into a digital signal; and a signal repeating means for returning the received digital signal to the signal converting means, when an arrival destination of the received digital signal converted by the signal covering means does not correspond to the current universal remote controller, such that an RF signal can be retransmitted.

In accordance with another aspect of the present invention, there is provided a control node for a ubiquitous home network, which includes: an RF communication unit for receiving an RF signal emitted from an universal remote controller; a signal converting unit for converting the RF signal received through the RF communication unit into a control signal to comply with control targets; and a control signal emitting unit for emitting the control signal converted by the signal converting unit to the control targets.

In an exemplary implementation, the RF communication unit includes: a signal transmitting/receiving means for transmitting/receiving RF signals; a signal converting means for converting a digital signal into an RF signal to provide it to the signal transmitting/receiving means and for converting the RF signal from the signal transmitting/receiving means into a digital signal; and a signal repeating means for returning the received digital signal to the signal converting means, when an arrival destination of the received digital signal converted by the signal covering means does not correspond to the current universal remote controller, such that an RF signal can be retransmitted.

In accordance with another aspect of the present invention, there is provided a control node for a ubiquitous home network, which includes: an RF communication unit for receiving an RF signal emitted from a home network server; a signal converting unit for converting the RF signal received through the RF communication unit into a control signal to comply with control targets; and a control signal emitting unit for emitting the control signal converted by the signal converting unit to the control targets.

In an exemplary implementation, the RF communication unit includes: a signal transmitting/receiving means for transmitting/receiving RF signals; a signal converting means for converting a digital signal into an RF signal to provide it to the signal transmitting/receiving means and for converting the RF signal from the signal transmitting/receiving means into a digital signal; and a signal repeating means for returning the received digital signal to the signal converting means, when an arrival destination of the received digital signal converted by the signal covering means does not correspond to the current universal remote controller, such that an RF signal can be retransmitted.

In accordance with another aspect of the present invention, there is provided a control node for a ubiquitous home network, which includes: an RF communication unit for receiving an RF signal emitted from a sensor node; a signal converting unit for converting the RF signal received through the RF communication unit into a control signal to comply with control targets; and a control signal emitting unit for emitting the control signal converted by the signal converting unit to the control targets.

In an exemplary implementation, the RF communication unit includes: a signal transmitting/receiving means for transmitting/receiving RF signals; a signal converting means for converting a digital signal into an RF signal to provide it to the signal transmitting/receiving means and for converting the RF signal from the signal transmitting/receiving means into a digital signal; and a signal repeating means for returning the received digital signal to the signal converting means, when an arrival destination of the received digital signal converted by the signal covering means does not correspond to the current universal remote controller, such that an RF signal can be retransmitted.

In accordance with another aspect of the present invention, there is provided a home network server for a ubiquitous home network system, which includes: an RF communication unit for receiving an RF signal to convert it into a digital signal and for emitting an RF signal converted from a digital signal; a command extracting unit for extracting a previously set control command for control targets, which is based on a user's command received from a universal remote controller through the RF communication unit, and for providing the extracted control command to the RF communication unit; and a command storing unit for storing the extracted control command of the control extracting unit.

In accordance with another aspect of the present invention, there is provided a home network server for a ubiquitous home network system, which includes: an RF communication unit for receiving an RF signal to convert it into a digital signal and for emitting an RF signal converted from a digital signal; a command extracting unit for extracting a previously set control command for control targets, which is based on information received from a sensor node through the RF communication unit, and for providing the extracted control command to the RF communication unit; and a command storing unit for storing the extracted control command of the control extracting unit.

BRIEF DESCRIPTION OF THE DRAWINGS

The above and other objects, features and other advantages of the present invention will be more clearly understood from the following detailed description taken in conjunction with the accompanying drawings, in which.

Throughout the drawings, like reference numerals will be understood to refer to like parts, components and structures.

BRIEF DESCRIPTION OF SYMBOLS IN THE DRAWINGS

Figure 1:
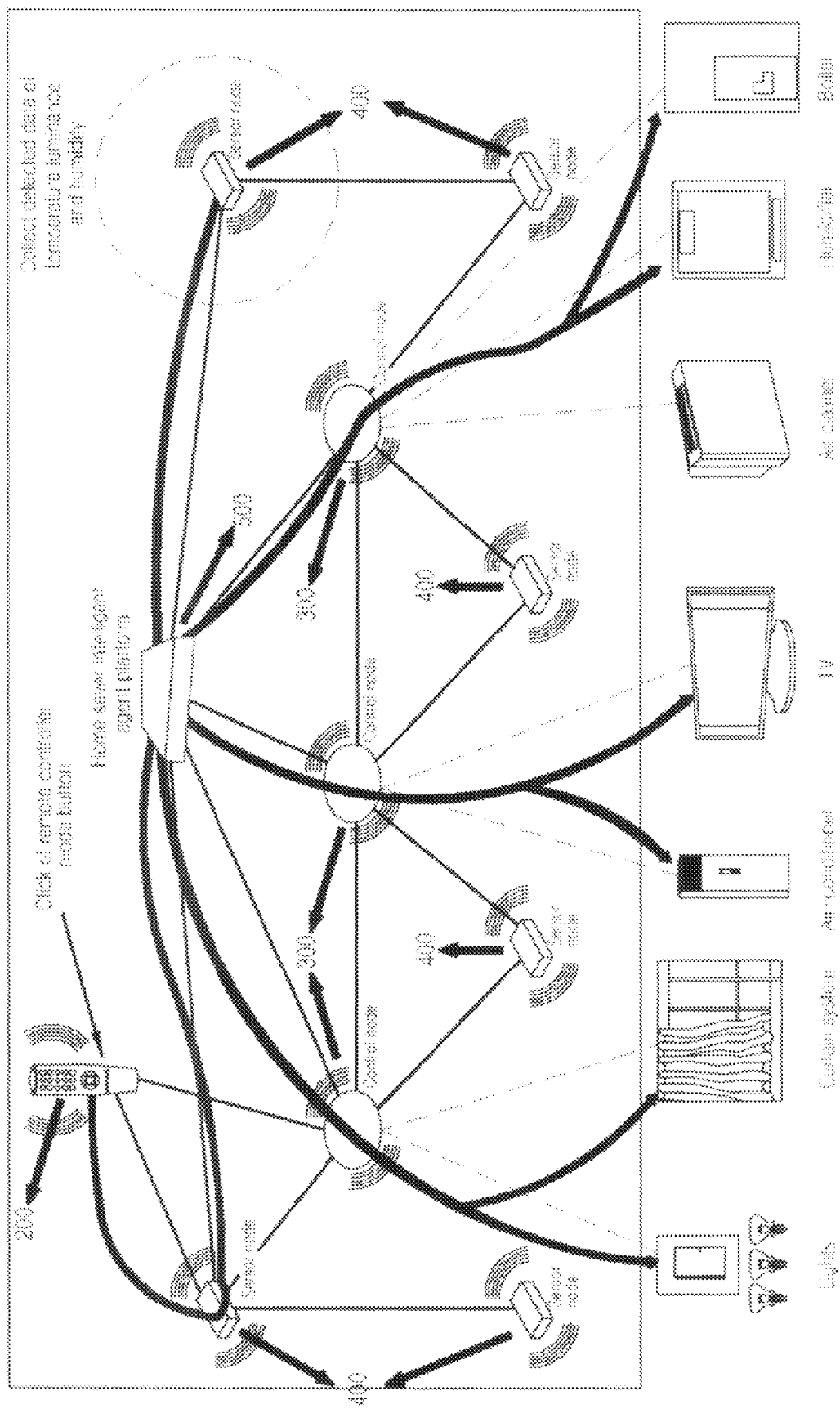
FIG. 1 is a view illustrating a ubiquitous home network system according to an exemplary embodiment of the present invention.

200: universal remote-controller
300: control node
400: sensor node
220, 310, 430, 510: RF communication unit
221, 311, 431: signal transmitting/receiving means
222, 312, 432: signal converting means
223, 313, 433: signal repeating means
500: home network server
520: comparing unit
530: command extracting unit
540: command storing unit

DETAILED DESCRIPTION OF EXEMPLARY EMBODIMENTS

Certain exemplary embodiments according to a ubiquitous home network system of the present invention will be described in detail with reference to the accompanying drawings.

FIG. 1 is a view illustrating a ubiquitous home network system according to an exemplary embodiment of the present invention.

Referring to FIG. 1, the ubiquitous home network system includes a universal remote controller 200, a plurality of control nodes 300, a plurality of sensor nodes 400, and a home network server 500.

The universal remote controller 200 converts a control command corresponding to a user's input command to an RF signal and emits it.

Figure 2:
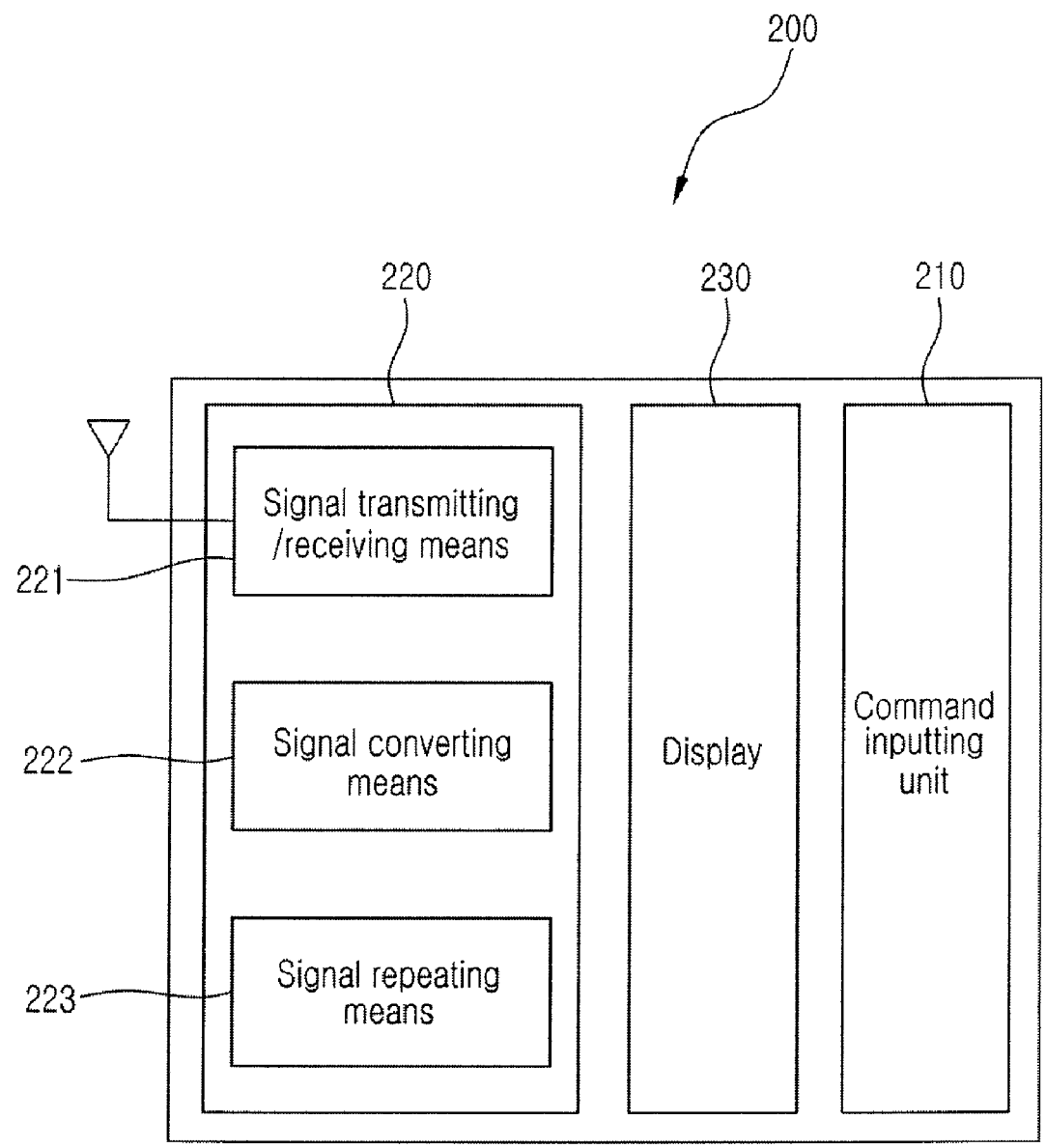
FIG. 2 is a schematic block diagram illustrating a universal remote-controller applied to the system of FIG. 1, according to an exemplary embodiment of the present invention.

FIG. 2 is a schematic block diagram illustrating a universal remote-controller applied to the system of FIG. 1, according to an exemplary embodiment of the present invention.

As shown in FIG. 2, the universal remote controller 200 includes a command input unit 210, an RF communication unit 220, and a display 230.

The command input unit 210 inputs users' commands and is configured to include a keypad and an element that can convert physical operations of the keypad into electrical command signals. The keypad is configured to include a plurality of keys for selecting well-known control targets (for example, for selecting which one of an air conditioner, a television, a boiler, etc. is controlled), a mode key for selecting a variety of modes (for example, a going out mode key, a sleep mode key, a basic mode key, a get up mode key, a leaving office mode key, an entertainment mode key, a user setting mode key, etc.), and a control key (for example, a key for controlling the temperature of an air conditioner, on/off keys for turning on/off a television or an audio set, etc., and keys for adjusting the volume of a television or an audio set, etc.).

Here, the mode key serves to set the control targets to a specific mode from among the variety of modes which are: a going out mode (for example, a mode where an air conditioner or lights is/are turned off), a sleep mode (for example, a mode where lights in the living room, a television, or an audio set, etc., is turned off and a boiler is controlled to keep the indoor temperature warm), a basic mode (for example, a mode that enables a user to manually and remotely control home appliances), a get up mode (for example, a mode where an alarm is set and a boiler and a humidifier are controlled to adjust the indoor temperature and humidity), a leaving office mode (a mode where an audio set, a boiler, and an air conditioner are controlled to adjust temperature and humidity for when a user is coming back to his/her home), an entertainment mode (a mode where a home theater is operated or home appliances are manually controlled), a user setting mode (a mode where respective home appliances are controlled according to a user's setting), etc.

The RF communication unit 220 emits an RF signal of a control command which is based on a user's command inputted through the command input unit 210 and receives an RF signal emitted from the sensor nodes 400 that detect information related to surrounding physical environments. The RF communication unit 220 includes a signal transmitting/receiving means 221, a signal converting means 222, and a signal repeating means 223.

The signal transmitting/receiving means 221 includes a commonly-used RF antenna to receive/transmit an RF signal.

The signal converting means 222 is configured to include a commonly-used RF module, which converts a received RF signal into a digital signal or converts a digital signal with information, which is to be transmitted, into an RF signal.

When the received RF signal is converted into a digital signal by the signal converting means 222, the signal repeating means 223 determines whether the arrival destination of the converted digital signal corresponds to itself (i.e., the universal remote controller). If the arrival destination does not correspond to itself, the signal repeating means 223 returns the received digital signal to the signal converting means 222 such that an RF signal can be re-transmitted, thereby repeating the RF signal. More specifically, the arrival destination of the RF signal emitted from the sensor nodes 400 may be the universal remote controller 200 or the home network server 500. When the RF signal that should have been transmitted to a home network server 500 is received by the universal remote controller 200, it is re-transmitted such that the received RF signal can arrive at the home network server 500. That is, the signal repeating means 223 repeats the RF signal.

When an RF signal arrives at the universal remote controller 200 according to its arrival destination, the display 230 displays information included in the RF signal. For example, when a sensor node 400 detects temperature and humidity, etc., at in living room and emits this information to the universal remote controller 200, the display 230 displays the detected temperature and humidity, so that a user can check them. Then, the user may input a command for controlling a boiler or a humidifier to the command input unit 210, as occasion demands, thereby adjusting temperature or humidity in the living room. Here, the display 230 can display information, such as temperature and humidity, according to user's selection. For example, while displaying only time in a normal state, when a user inputs a command enabling a current temperature to be displayed through the command input unit 210, the display 230 displays a temperature which had been received and updated before the command was inputted.

Figure 3:
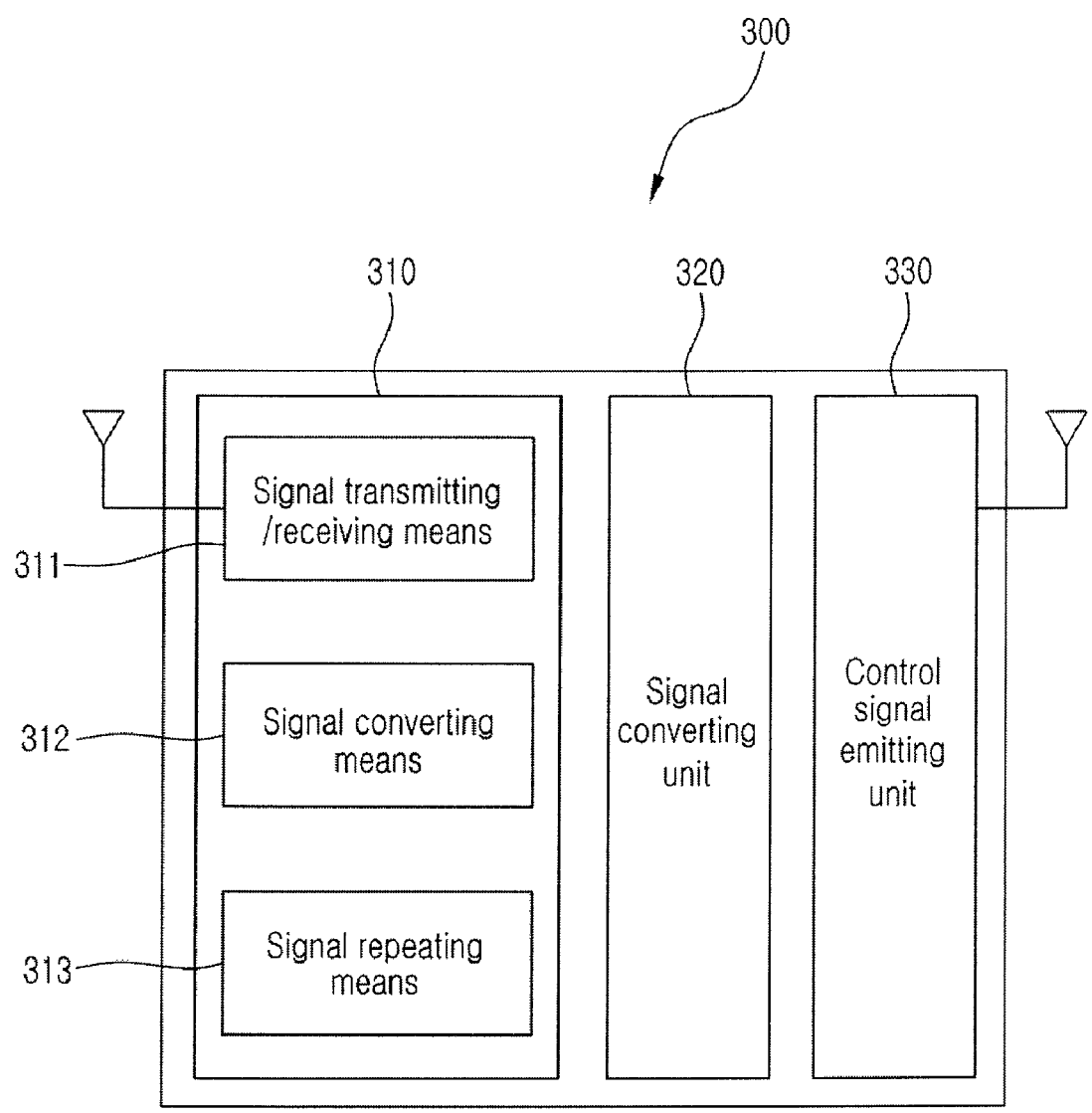
FIG. 3 is a schematic block diagram illustrating a control node applied to the system of FIG. 1, according to an exemplary embodiment of the present invention.

FIG. 3 is a schematic block diagram illustrating a control node applied to the system of FIG. 1, according to an exemplary embodiment of the present invention.

As shown in FIG. 3, the control node 300 converts an RF signal into a control signal to comply with a corresponding control target and emits it, in which the RF signal is based on a control command, received from the universal remote controller 200 or the home network server 500, and information received from the sensor node 400. Here, the control signal may be an infrared ray signal used to control home appliances. To this end, the control node 300 includes an RF communication unit 310, a signal converting unit 320, and a control signal emitting unit 330.

The RF communication unit 310 receives/transmits RF signals from/to the universal remote controller 200, the home network server 500, and the sensor nodes 400. The RF communication unit 310 includes a signal transmitting/receiving means 311, a signal converting means 312, and a signal repeating means 313.

The signal transmitting/receiving means 311 serves to transmit/receive RF signals, and includes a commonly used RF antenna.

The signal converting means 312 is configured to include a commonly used RF module, which converts a received RF signal into a digital signal or converts a digital signal with information, which is to be transmitted, into an RF signal.

When the received RF signal is converted into a digital signal by the signal converting means 312, the signal repeating means 313 determines whether the arrival destination of the converted digital signal corresponds to itself (i.e., the control node). If the arrival destination does not correspond to itself, the signal repeating means 313 returns the received digital signal to the signal converting means 312 such that an RF signal can be re-transmitted, thereby repeating the RF signal. More specifically, the arrival destination of the RF signal emitted from the sensor node 400 may be another control node 300, the universal remote controller 200, or the home network server 500. When the RF signal that should have been transmitted to another destination is received by the control node 300, it is re-transmitted such that the received RF signal can arrive at the destination. That is, the signal repeating means 313 repeats the RF signal.

When a digital signal converted from an RF signal received through the RF communication unit 310 corresponds to a control target, the signal converting unit 320 converts the digital signal into a control signal (for example, an infrared ray signal) to comply with the control target.

The control signal emitting unit 330 emits the converted control signal to control the control target. That is, a corresponding control signal can serve to control a corresponding control target.

Although one control node 300 is implemented in such a way to control one control target in an exemplary embodiment of the present invention, it will be easily appreciated that it can be configured to control two or more control targets. That is, one control node 300 is modified to control both a DVD player and a television, for example.

Figure 4:
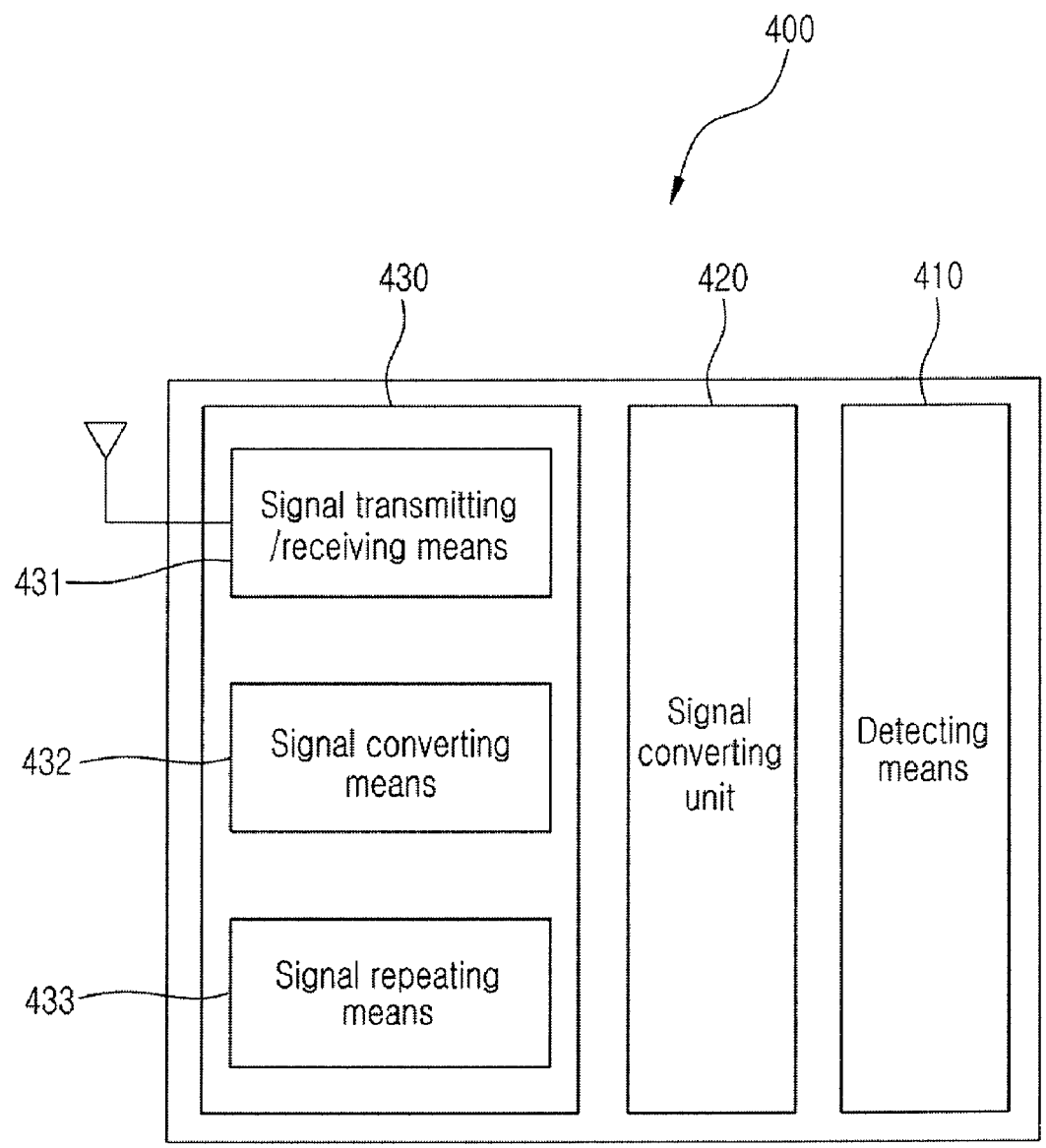
FIG. 4 is a schematic block diagram illustrating a sensor node applied to the system of FIG. 1.

FIG. 4 is a schematic block diagram illustrating a sensor node applied to the system of FIG. 1.

The sensor node 400 detects a surrounding physical environment and emits this information thereto. The sensor node 400 includes a plurality of conventional USN nodes to repeat RF signals.

Each sensor node 400 includes a detecting means 410, a signal converting unit 420, and an RF communication unit 430.

The detecting means 410 detects a surrounding physical environment, for example detects humidity, temperature, etc.

The signal converting unit 420 converts analogue information detected by the detecting means 410 into digital information.

The RF communication unit 430 converts the digital information converted by the signal converting unit 420 into an RF signal to emit it. The RF communication unit 430 includes a signal transmitting/receiving means 431, a signal converting means 432, and a signal repeating means 433.

The signal transmitting/receiving means 431 is configured to include a commonly used RF antenna to receive/transmit RF signals.

The signal converting means 432 is configured to include a commonly used RF module, which converts a received RF signal to a digital signal or converts a digital signal with information, which will be transmitted, into an RF signal.

When the received RF signal is converted into a digital signal by the signal converting means 432, the signal repeating means 433 determines whether the arrival destination of the converted digital signal corresponds to itself (i.e., the sensor node). If the arrival destination does not correspond to itself, the signal repeating converting means 433 returns the received digital signal to the signal converting means 432 such that an RF signal can be re-transmitted, thereby repeating the RF signal.

Figure 5:
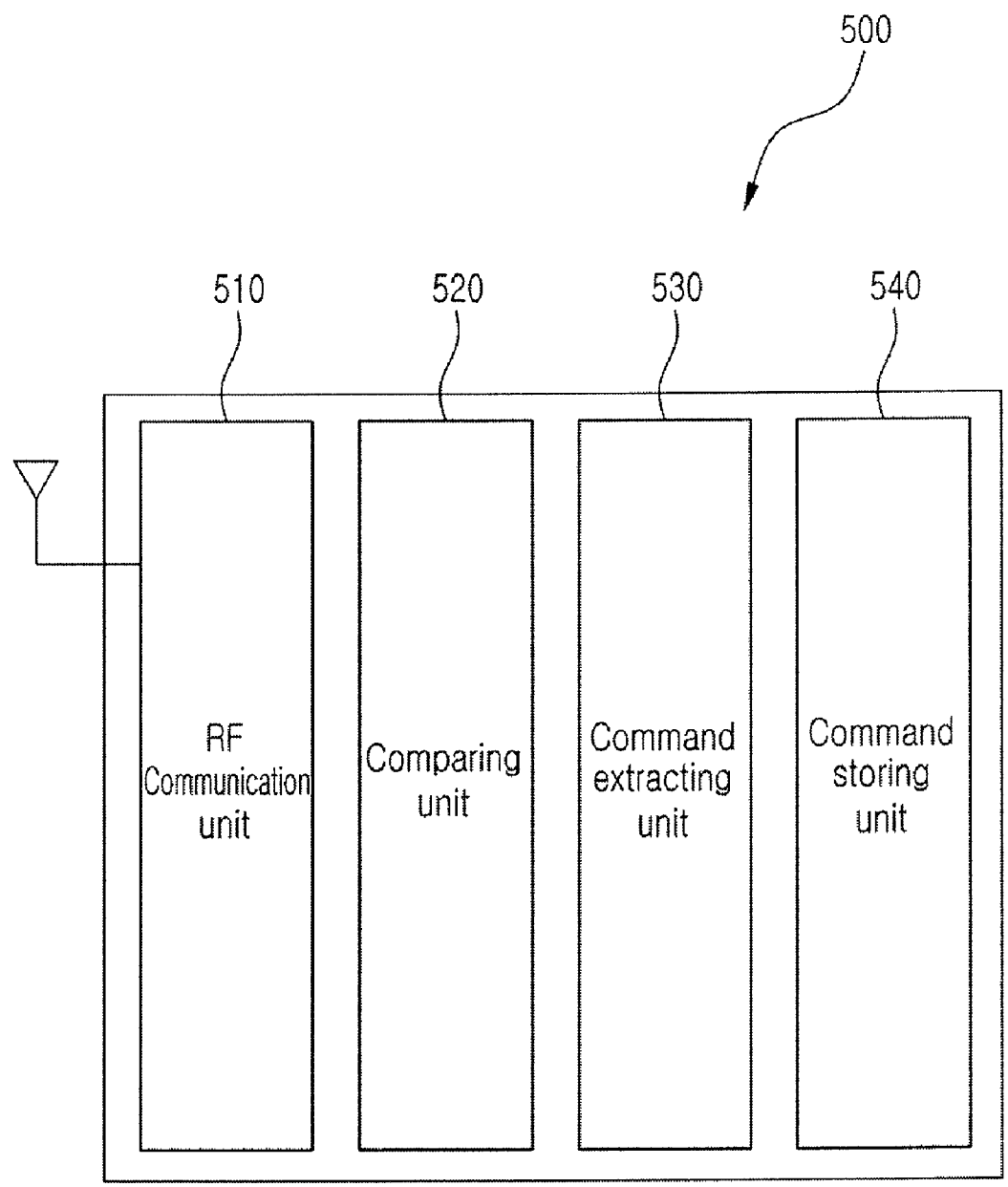
FIG. 5 is a schematic block diagram illustrating a home network server applied to the system of FIG. 1, according to an exemplary embodiment of the present invention.

FIG. 5 is a schematic block diagram illustrating a home network server applied to the system of FIG. 1, according to an exemplary embodiment of the present invention.

The home network server 500 emits a previously set control command, which corresponds to an RF signal received from the universal remote controller 200, to the control node 300 to control a variety of control targets. To this end, the home network server 500 includes an RF communication unit 510, a comparing unit 520, a command extracting unit 530, and a command storing unit 540.

The RF communication unit 510 serves to perform transmission/reception of RF signals. That is, the RF communication unit 510 converts a received RF signal into a digital signal or converts a digital signal to an RF signal to emit it.

The comparing unit 520 compares information received from the sensor node 400 with user's setting information. For example, if a user sets an indoor temperature to 27° C., the comparing unit 520 compares 27° C. with the current indoor temperature from the sensor node 400, for example 20° C., and determines that the current indoor temperature is lower than the set temperature.

When the command extracting unit 530 receives a command from a user (the universal remote controller) through the RF communication unit 510, or is in a situation where it must control targets according to settings because information received from the sensor node is not identical to the setting information, it extracts the command of a user or a control command, previously set based on information comparison, from the command storing unit 530.

The command storing unit 530 stores a variety of control commands (where control commands refer to commands previously set by a user) that will be emitted to the control node 300. More specifically, the control commands refer to commands that indicate what kind of control target is controlled and how to control the control target in a sleeping mode, and how to control the control targets if information received from the sensor node 400 is not identical to information set by a user.

The following is a description of an exemplary embodiment of a method according to the present invention, for controlling control targets included in the ubiquitous home network system as constructed above.

Control by Universal Remote Controller, Through Control Node

An exemplary embodiment relates to a control method where the universal remote controller 200 emits an RF signal corresponding to a user's command to the control node 300 and the control node 300 converts the RF signal into a control signal to emit the control signal.

When a user desires to control a plurality of control targets through the command input unit 210 of the universal remote controller 200, a corresponding control target is selected through the command input unit 210 and then an operation command for the corresponding control target is inputted to the universal remote controller 200. For example, when lowering a setting temperature of an air conditioner by 1° C., a user designates the air conditioner using a selection key of the command input unit 510 and then inputs a command to lower the setting temperature by 1° C. using a control key.

The universal remote controller 200 creates an RF signal according to the user's inputted command and the identification information of the designated air conditioner, and emits the RF signal. For example, the RF signal is created according to a command lowering the temperature of the air conditioner by 1° C. and identification information of a control node 300 in charge of controlling the air conditioner, and is then emitted.

The emitted RF signal reaches the control node 300 in charge of a corresponding control target, directly or through a repeating of the sensor node 400 or other control node 300. Here, the sensor node 400 or other control node 300 converts the received RF signal to a digital signal and then determines whether the arrival destination of the received RF signal corresponds to itself. If the arrival destination does not correspond to itself, the digital signal is reconverted into an RF signal to be emitted.

If the control node 300 in charge determines that the arrival destination of the received RF signal corresponds to itself, it converts an RF signal according to the arrived user's command into a control signal (for example, an infrared ray signal) for controlling the air conditioner, and then emits the converted control signal. Therefore, through the above processes, the setting temperature of the air conditioner can be lowered by 1° C.

Control by Universal Remote Controller, Through Control Node Via Home Network Server An exemplary embodiment relates to a control method where, when the universal remote controller 200 selects a certain mode, the home network server 500 emits RF signals of various control commands, set by the selected mode to respective control nodes 300 in charge, and the respective control nodes 300 in charge convert the RF signals into control signals to emit them.

When a user desires to control one or more control targets according to a certain mode through the command input unit 210 of the universal remote controller 200, one of mode keys of the command input unit 510 is selected and then operated. For example, when the user wants to select a going out mode, a going out mode key of the command input unit 510 is selected and then operated.

The universal remote controller 200 creates an RF signal according to the inputted user's mode selection command and then emits it.

After receiving the emitted RF signal, the home network server 500 analyzes a mode command from the received RF signal and determines that the mode is a going out mode. After that, control commands corresponding to the going out mode stored in the command storing unit 540 are extracted through the command extracting unit 530. For example, when the going out mode corresponds to an operation where lights and an air conditioner are turned off, the command extracting unit 530 extracts a control command corresponding to the going out mode from the command storing unit 540 whose going out mode category stores control commands of the operation where lights and an air conditioner are turned off.

The RF communication unit 510 converts the extracted control command into an RF signal to emit it. The emitted RF signal is reached to the control node 300 in charge (a light control node, and an air conditioner control node), directly or through the sensor node 400 or other control node 300.

Each control node 300 in charge receives an RF signal of the control command and creates each infrared ray signal according to the control command to emit the infrared ray signal. Therefore, the light and the air conditioner can be turned off to comply with the going out mode.

Control by Information Detected in Sensor Node

An exemplary embodiment relates to a method for controlling control targets according to information detected by the sensor node 400, though the control node 300.

The sensor node 400 serves to detect information about a surrounding physical environment, such as temperature, humidity, etc. An exemplary embodiment of the present invention will be described based on a case where temperature is detected by the sensor node 400.

When the sensor node 400 detects 20° C. as a current temperature, the detected information is converted into an RF signal and then transmitted to the home network server 500. As well, the detected information may be transmitted to the home network server 500, directly or through other sensor node 400 or the control node 300.

The home network server 500 analyzes temperature information received from the sensor node 400 and then compares the analyzed temperature information, i.e., the current temperature (20° C.), with a user's setting temperature information.

If the user's setting temperature is 23° C., the home network server 500 determines that the current temperature is lower than the setting temperature and then creates a boiler control command. That is, the home network server 500 creates a command that makes a boiler raise the temperature to 23° C. After that, the home network server creates an RF signal according to a corresponding command and identification code identifying a control node 300 in charge of the boiler and emits it.

Therefore, the control node 300 in charge of the boiler receives a corresponding command and then creates a control signal according to the corresponding command to emit it, thereby controlling the boiler.

As well, an exemplary embodiment may be modified in such a way that the information detected by the sensor node 400 is directly transmitted to the control node 300 without going via the home network server 500, such that the information that the sensor node 300 received from the sensor node 400 is compared with information having been stored in the control node 300 sensor to control the control targets.

Display of Information Detected in Sensor Node

An exemplary embodiment relates to a method for displaying information detected by the sensor node 400 through the universal remote controller 200.

For example, it is assumed that it is summer and a baby is sleeping in one room while its parents are quietly watching television in the living room.

The universal remote controller 200 performs a setting that a current temperature of the baby's room can be displayed, through the command input unit 510.

The sensor node 400 periodically detects the temperature of the baby's room to transmit it to the universal remote controller 200.

If the detected temperature is greater than 30° C., the parents check the detected temperature displayed on the universal remote controller 200 and then operate the universal remote controller 200 to select the air conditioner in the baby's room. After that, a command operating the air conditioner is inputted to the universal remote controller or another command lowering the temperature of the room to 27° C. is inputted to the universal remote controller, if the air conditioner is currently operated.

The universal remote controller 200 creates an RF signal according to a corresponding command to emit it to the control node 300. The control node 300 in charge of the air conditioner in the baby's room converts the received RF signal into a control signal to emit to the air conditioner, so that the air conditioner operates to lower the temperature of the baby's room to 27° C.

An exemplary embodiment is modified in such way that a suitable temperature for the baby's room is previously set to the universal remote controller 200 and an alarm goes off when a current temperature received from the sensor node 400 is deviated from the suitable temperature.

The foregoing has been described an exemplary embodiment of the present invention that includes all elements. However, it will be easily appreciated that the present invention may be achieved when each signal communication path from a universal remote controller to the control targets selectively includes elements from among all the elements. In particular, the present invention may be achieved by only one of the control methods or by selectively combining two or more control methods.

Although certain exemplary embodiments of the present invention have been disclosed for illustrative purposes, those skilled in the art will appreciate that various modifications, additions and substitutions are possible, without departing from the scope and spirit of the invention as disclosed in the accompanying claims and their equivalents.

As described in the foregoing, since the present invention uses RF signals based on combination of the remote-controller and the ubiquitous sensor network (USN) technologies, it allows a user to conveniently control a plurality of control targets within the range of an RF signal. As well, the present invention provides convenience in that the control targets are automatically controlled based on the information detected by the respective sensor nodes.

What is claimed is:

1. A ubiquitous home network system comprising:
    a universal remote controller for converting a control command (CC-UC) according to a user's command (UC) into a radio frequency (RF) signal (RF-URC) to emit the RF signal (RF-URC);
    at least one or more control nodes for converting the control command (CC-UC) according to the RF signal (RF-URC), received from the universal remote controller, into a control signal (CS-CN) to comply with control targets and emit the control signal (CS-CN); and
    a signal repeating means for determining whether the arrival destination of the converted control signal corresponds to the converting control node, and, when the arrival destination does not correspond to the converting control node, for returning the received control signal to the signal converting control node such that an RF signal can be re-transmitted.

2. The system according to claim 1, further comprising a home network server for emitting a previously set control command (CC-HNS) corresponding to the RF signal (RF-URC), received from the universal remote controller, to said at least one or more control nodes to control the control targets.

3. The system according to claim 2, further comprising at least one or more sensor nodes for detecting information from a surrounding physical environment, converting the detected information into an RF signal (RF-SN), and providing the RF signal (RF-SN) to the home network server,
    wherein the home network server emits a previously set control command (CC-SN) corresponding to the RF signal (RF-SN), received from said at least one or more sensor nodes, to said at least one or more control nodes to control the control targets.

4. The system according to claim 3, wherein the sensor nodes re-emit received RF signals.

5. The system according to claim 2, further comprising at least one or more sensor nodes for detecting information from a surrounding physical environment, converting the detected information into an RF signal (RF-SN), and providing the RF signal (RF-SN) to the universal remote controller,
    wherein the universal remote controller receives the RF signal (RF-SN), received from said at least one or more sensor nodes, and displays information according to the received RF signal (RF-SN).

6. The system according to claim 1, wherein the control nodes re-emit received RF signals.

7. The system according to claim 1, wherein the universal remote controller re-emits a received RF signal.

8. A ubiquitous home network system comprising:
    a sensor node for detecting information from a surrounding physical environment, converting the detected information into an RF signal (RF-SN), and emitting the RF signal (RF-SN);
    a home network server for emitting an RF signal (RF-HN) of a previously set control command that corresponds to the RF signal (RF-SN), received from the sensor node;
    at least one or more control nodes for converting the RF signal (RF-HN), received from the home network server, into a control signal (CS-CN) to comply with control targets, and emitting the control signal (CS-CN); and
    a signal repeating means for determining whether the arrival destination of the converted control signal corresponds to the converting control node, and, when the arrival destination does not correspond to the converting control node, for returning the received control signal to the signal converting control node such that an RF signal can be re-transmitted.

9. The system according to claim 8, wherein the sensor node comprises a plurality of sensor nodes.

10. The system according to claim 9, wherein the sensor nodes re-emit received RF signals.

11. The system according to claim 8, wherein the control nodes re-emit received RF signals.

* * * * *